United States Patent [19]
Madore et al.

[11] Patent Number: 5,909,672
[45] Date of Patent: Jun. 1, 1999

[54] ACTIVITY BASED TIME ACCOUNTING SYSTEM

[75] Inventors: Christopher L. Madore, Vancouver, Wash.; Lanny E. Boswell, Lincoln, Nebr.

[73] Assignee: Time Trak, LLC, Cypress, Calif.

[21] Appl. No.: 08/748,093

[22] Filed: Nov. 12, 1996

[51] Int. Cl.$^6$ .................................................. G06F 17/00
[52] U.S. Cl. ............................................. 705/32; 702/178
[58] Field of Search .............................. 702/178; 346/20, 346/82; 364/188; 377/20; 705/32

[56] References Cited

U.S. PATENT DOCUMENTS

| | | | |
|---|---|---|---|
| D. 366,217 | 1/1996 | Dudley et al. | D10/46 |
| 4,847,791 | 7/1989 | Martin et al. | 702/178 |
| 4,961,158 | 10/1990 | Sussman | 364/709.04 |
| 5,142,486 | 8/1992 | Guntharp, Jr. et al. | 364/709.04 |
| 5,493,492 | 2/1996 | Cramer et al. | 364/406 |

*Primary Examiner*—Thomas Peeso
*Attorney, Agent, or Firm*—McAfee & Taft

[57] ABSTRACT

An activity based time accounting system consisting of a plurality of personal data collection devices (PDCD's) which are carried by selected users or workers during a predetermined use period, a central storage and processing facility (SPF) for receiving and storing each of the PDCD units in electrical interconnection during other than said use periods, and circuitry in said PDCD units for recording time accounting data for each of the selected users during each use period; and including collection circuitry for gathering all PDCD unit data during the other than said use periods for compilation and transmission for processing with business accounting software.

20 Claims, 7 Drawing Sheets

Microfiche Appendix Included
(1 Microfiche, 26 Pages)

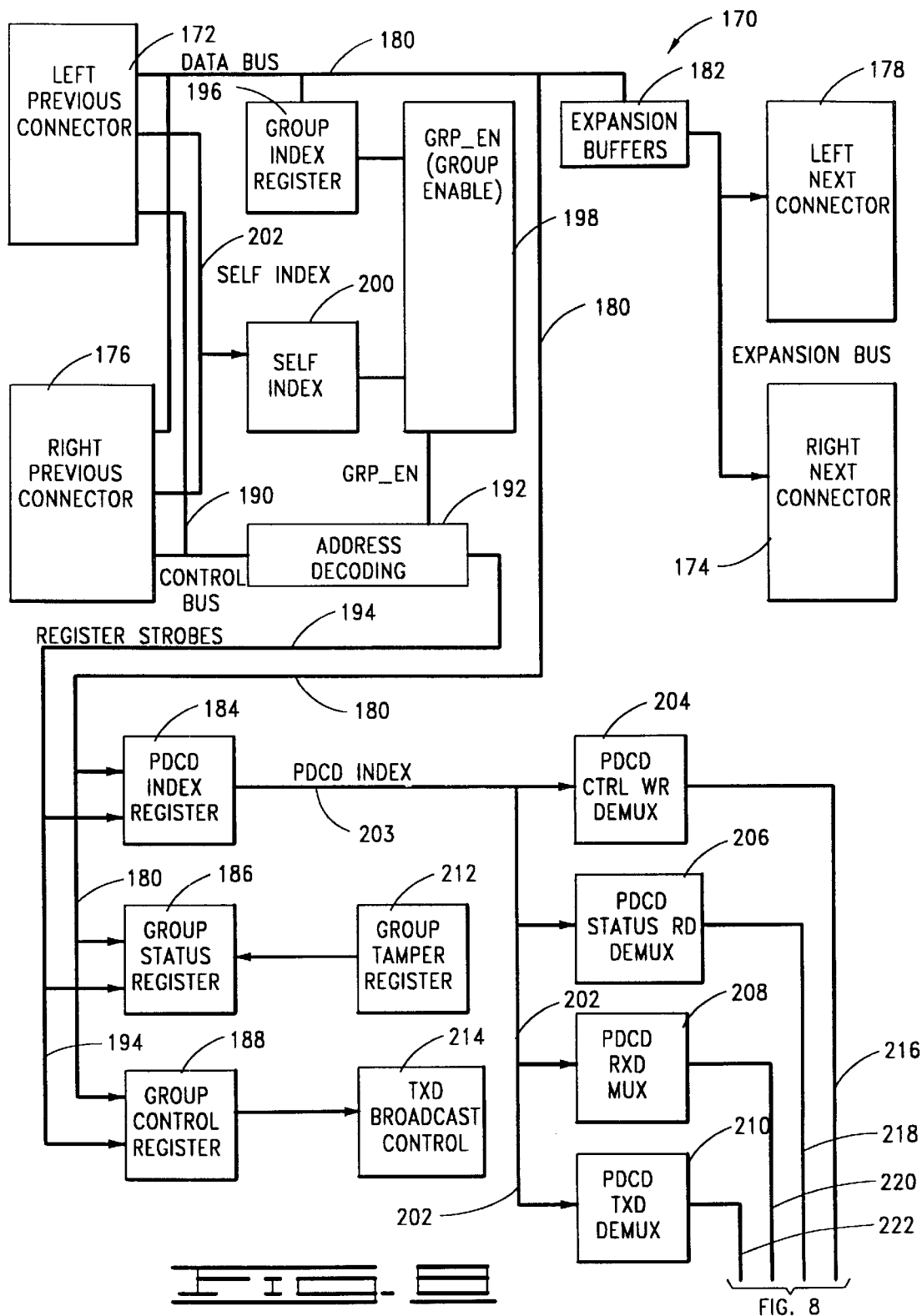

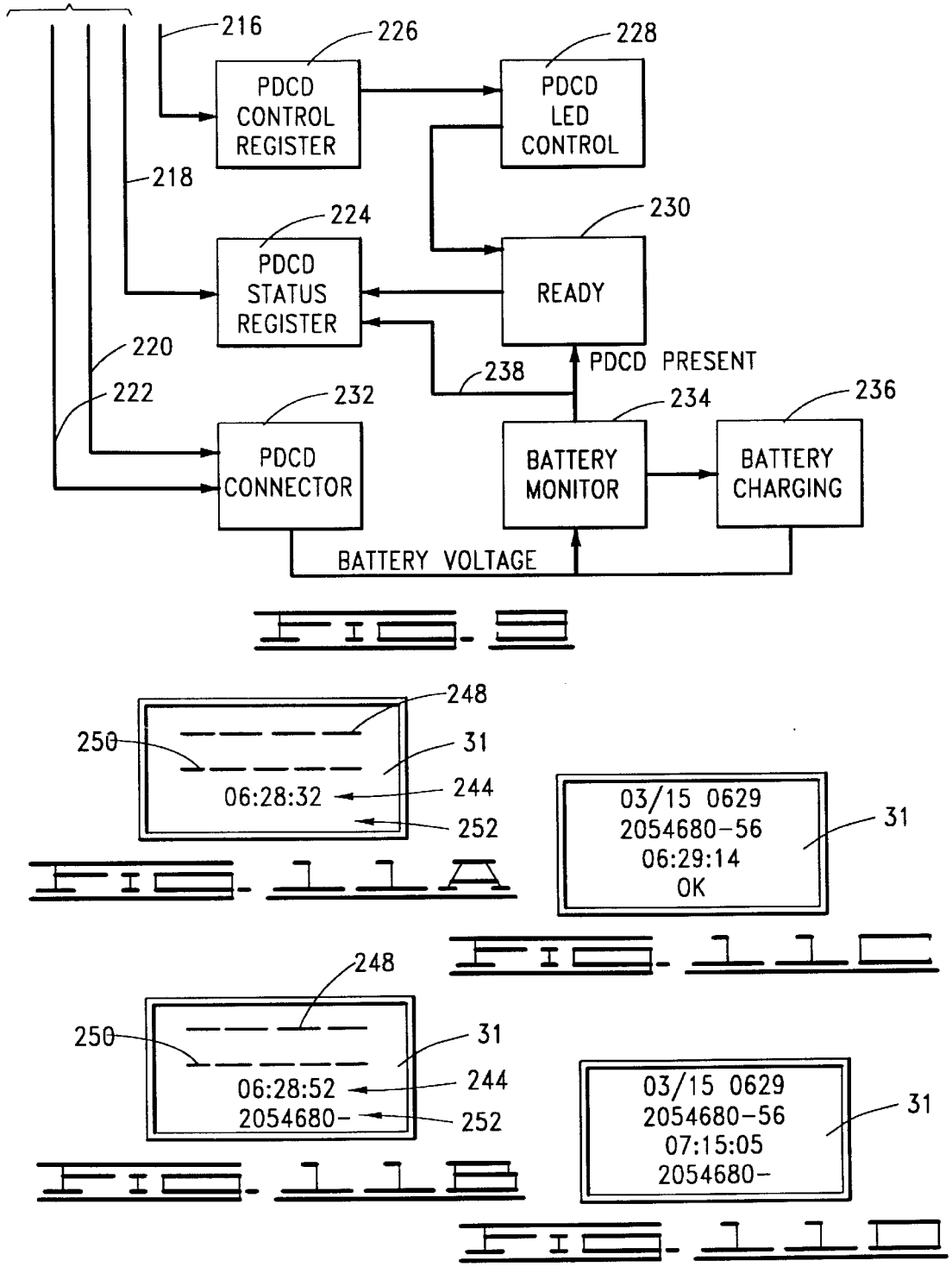

ACTIVITY BASED TIME ACCOUNTING SYSTEM

MICROFICHE APPENDICES

APPENDIX I—Application Generation Source Files for Time Trak

APPENDIX II—Example of Communications Interface to PDCD Unit

APPENDIX III—PDCD ROM Generation Sources Files for Time Trak

This microfiche contains 1 page of 26 frames,

BACKGROUND OF THE INVENTION

1. Field of the Invention

The invention relates generally to a time keeping and recording system that accounts for work activities by given employees in specific working activities. Each worker carries a personal data collection device (PDCD) that provides input data to a central storage and processing facility (SPF) which is used to store, maintain and retrieve data from the multiple of PDC devices.

2. Description of the Prior Art

U.S. Pat. No. 4,961,158 teaches an electronic hand-held memory device that functions as a portable transaction cost tracking device and one in which the user is able to define the transaction to be tracked. The device functions as a portable electronic calculator having the capability of tracking a variety of sales or data purchases to provide general transaction data. Such transaction data consists of a description of the transacted item or service, an associated quick reference code of the said description, the unit cost of said item, a cost limit not to be exceeded for the item or service, total cost of the transaction, the number of unit items or services that the total cost incorporates, and the date and time in which the transaction was made. The device interacts with the user by means of system function keys on keypad and system generated prompts appear on the device's display unit. The device is capable of bi-directionally exchanging data with an external computer system.

U.S. Pat. No. 5,493,492 discloses a device for recording billable time and services. The device includes memory that stores user selected information relating to a specific user, client and activity along with corresponding start and stop times. The device then communicates with a central billing computer to collect and correlate data findings. U.S. Pat. No. 5,142,486 discloses an electronic monitoring device for tracking the number of hours worked during a period covering a preselected number of consecutive work days. The device consists of a computer contained in a case that includes a keyboard for entering the number of hours worked at the end of a work day. The unit includes memory means containing information that relates to the maximum number of hours that are permitted to be worked during a period of consecutive work days.

SUMMARY OF THE INVENTION

The present invention relates to a storage and processing facility (SPF) that is used to store, maintain and retrieve data from a multiple of personal data collection devices (PDCD). The storage and processing facility is a part of a total system which is called Time Trak that functions to automate the collection and interpretation of information for activity based cost accounting. The SPF is physically divided into one base section and one or more group sections. The base section contains the microprocessor and other circuitry that provides the interface between the Time Trak and other host computer systems. Each group section can store up to eight PDCD data collections and additional group sections may be easily added to the Time Trak system to increase total system capability. The SPF base section microprocessor is modular, using the industry standard PC/104 form factor. This allows several different options for the processor speed, memory and related features. The PC/104 form factor also allows for future expansion to the Time Trak system through the use of off-the-shelf or custom products. Each group section provides the interface and support circuitry for up to eight PDCD units. The interface between the PDCD and the group section allows the group to retrieve the data stored on the PDCD, to modify the PDCD program memory and to update the user information stored in the PDCD. Battery management circuitry allows the group to determine the status of the PDCD battery as well as to charge the PDCD battery under control software.

Therefore, it is an object of the invention to provide an activity based time accounting system that automatically creates a computer network accessible data file which details the activity based time accounting for each employee on a daily basis.

It is also an object of the invention to provide a small, lightweight device that is carried by each employee during the work period and is placed in interactive communication with a central storage and processing facility.

It is yet another object of the present invention to provide a personal data collection device for carriage by each employee that communicates with a central storage and processing facility for uploading or downloading of all operating parameters, data, program data, date or time information when required.

Finally, it is an object of the present invention to provide a storage and processing facility that supplies a storage location for all personal data collection devices during non-working hours while also automatically collecting time accounting information stored in each data collection device.

Other objects and advantages of the invention will be evident from the following detailed description when read in conjunction with the accompanying drawings that illustrate the invention.

BRIEF DESCRIPTION OF THE DRAWINGS

FIG. 8 is a block diagram of a part of an SPF group unit;

FIG. 9 is a block diagram of one of a multiple of second parts of the SPF group;

FIG. 11A is a plan view of the PDCD display screen at beginning work stage;

FIG. 11B is a plan view of the PDCD display screen when entering job data;

FIG. 11C is a plan view of the PDCD display screen when entering job-activity code; and FIG. 11D is a plan view of the PDCD display screen at final entry time.

DETAILED DESCRIPTION OF THE INVENTION

Figure 1:
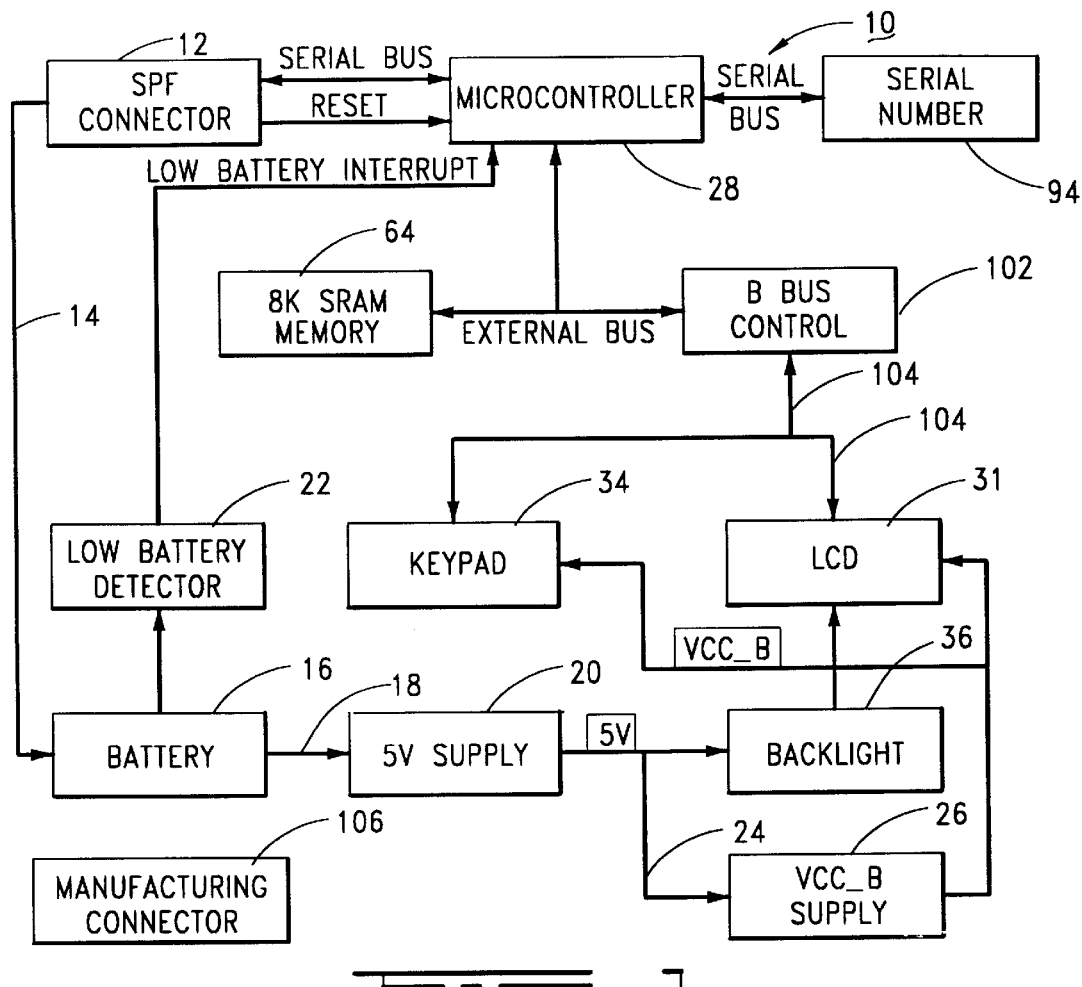
FIG. 1 is a block diagram showing the operational blocks of the personal data collection device (PDCD) as constructed in accordance with the present invention.

FIG. 1 shows a PDCD 10 which is a personal data collection device, one of which is carried by each worker in the force for coaction with a central storage and processing facility (SPF). The PDCD 10 includes an SPF connector 12 which provides for connection between the PDCD 10 and the SPF. The SPF connector 12 is a six conductor connector used to provide a battery connection on line 14 to two batteries 16 which are 1.2 volt nickel-cadmium batteries (Sanyo™ type KFB 450) having a capacity of 400 milliampere hours each. The batteries 16 are also connected via line 18 to the 5 volt power supply 20 which includes a Linear Tech type LT 1303-5 micropower high efficiency switching regulator. The regulator integrated circuit within supply 20 also includes a low battery detector that is used in the low battery comparator block 22. Output from 5 volt supply 20 is applied on lead 24 to the VCC B supply stage 26 that includes the ability to switch the secondary supply on and off. A P-channel MOSFET is used to switch the VCC B supply to its source, 5-volt supply 20. The MOSFET is controlled through the VCC B enable signal generated by a microcontroller 28, and this signal is active when the PDCD 10 is in a NORMAL or DOCKED mode, while it is inactive when the PDCD 10 is in the OFF mode.

Figure 2:
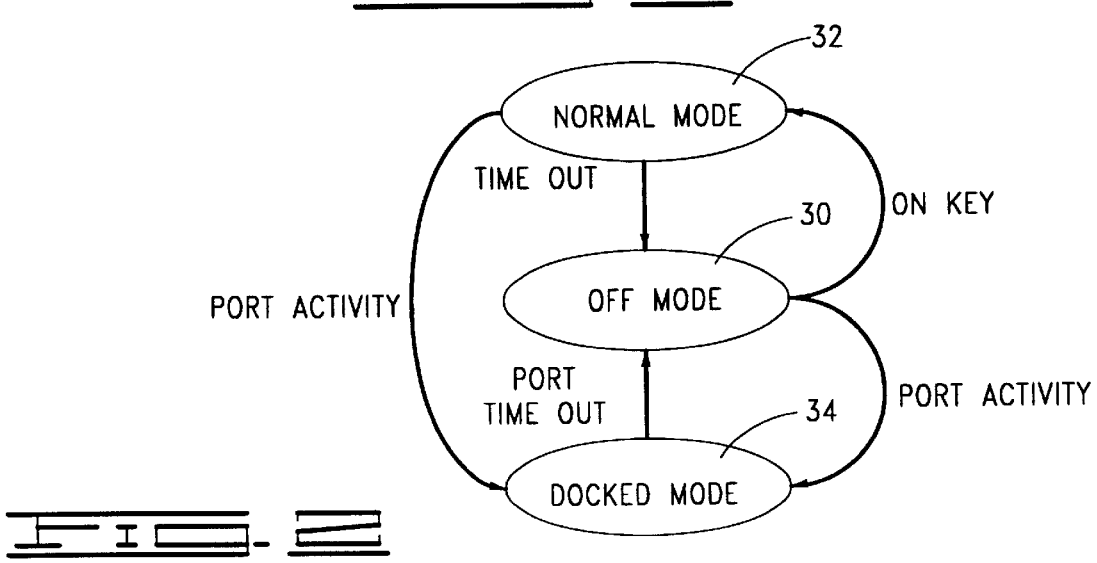
FIG. 2 is a block diagram illustrating operational modes and interaction of the PDCD.

FIG. 2 illustrates the operational modes wherein the PDCD 10 may operate in one of three different modes: the OFF mode 30, NORMAL mode 32 and DOCKED mode 34. In the OFF mode 30, the LCD (to be described) and switching supply are inactive and the microcontroller 28 (FIG. 1) operates mostly in the idle state. Power consumption is at a minimum as the only activity performed by the microcontroller 28 is updating the real time clock. The PDCD 10 will spend the majority of its time in the OFF mode 30.

In the NORMAL mode 32, the LCD 31 and switching supply 26 are active such that the keypad 34 (FIG. 1) and backlight 36 may be ON or OFF. The PDCD 10 enters NORMAL mode 32 from OFF mode 30 when the user presses the ON key. The PDCD 10 will return to OFF mode after the user has completed his data entry and a minimum amount of idle time has elapsed.

In the DOCKED mode 34, the LCD 31 and switching supply 26 are active and the PDCD 10 is connected to the SPF (to be described below) through a serial port and communications with the SPF may be occurring. Normally, the batteries 16 are charged at either a quick or trickle charge rate.

The keypad 34 provides for a 16 key user interface, a conventional keypad array, consisting of a four by four matrix of single throw switches with one open position. The sixteenth switch key serves as the ON key and is not in the scanned matrix. All keys are normally open, single pole, single throw switches. A plurality of current loading resistors are employed around the switch matrix to provide protection from any static electricity transferred from the user's finger to the keys. Keypad 34 is scanned when the PDCD 10 is in the NORMAL mode 32 (FIG. 2), but is not scanned in the OFF or DOCKED modes 30 and 34, except for the ON key, i.e., the sixteenth key switch.

The microcontroller 28 includes a microcontroller, IC type 80 CL51 and its supporting circuitry. The microcontroller 28 internal circuitry can be divided into the following sections: the processing unit, the memory section, timer 0, timer 1, serial port, buss interface, control port and interrupt section, to be described. Such supporting circuitry also includes an octal latch for the external buss and the oscillator circuit. The internal circuit divisional sections consist mainly of conventional support circuits for microprocessor circuitry.

Figure 3:
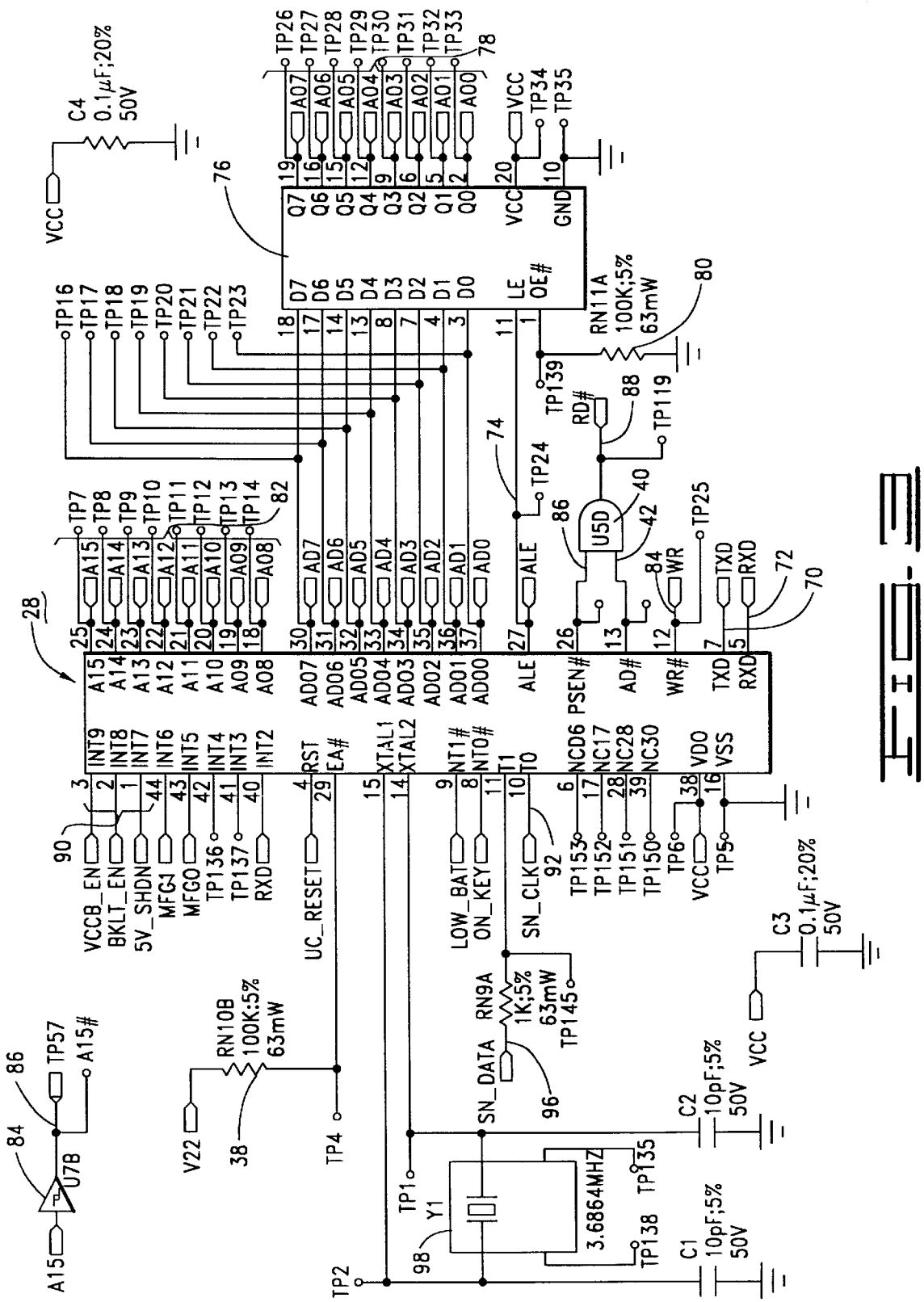
FIG. 3 is a schematic illustration of a microcontroller as employed in the PDCD of FIG. 1.
Figure 4:
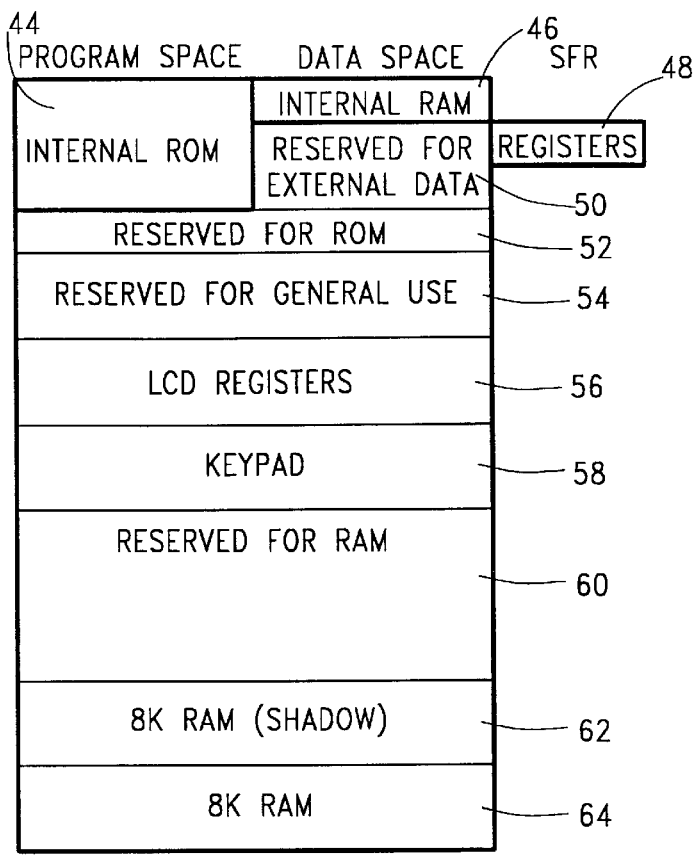
FIG. 4 is a memory map for a PDCD unit.

Referring to FIG. 3, the processing unit executes instructions which control the operation of the microcontroller 28, and these instructions are fetched from either the internal ROM memory or from external RAM memory via the buss interface. The time required to execute an instruction is measured in machine cycles, with most instructions requiring one or two machine cycles to operate. A single machine cycle occurs at one-twelfth of the oscillator frequency, and since the PDCD 10 oscillator has a frequency of 3.6864 megahertz, the machine cycle rate is 307.2 kilohertz, a cycle period of approximately 3.26 microseconds. The microcontroller 28 supports an SPF-controlled reset. Thus, when the PDCD 10 is connected to the SPF and is not responding to serial port commands, the SPF can restart the PDCD 10 microcontroller by asserting its reset signal. The memory section of the microcontroller 28 is spread into three address spaces: program memory, data memory and special function registers. The program memory address space is 64K bytes in size with the first 4K as internal ROM. As shown in FIG. 3, a pullup resistor 38 connected to the microcontroller 28's E.A. # pin 29 allows the remaining 60K of storage to be accessed as external memory. The program memory is read only. The external data memory is also 64K in size and can be both read and written. The special function register space is 128 bytes in size and is internal to the microcontroller 28. The internal data memory is 128 bytes in size and is also internal to microcontroller 28. In the PDCD 10 the external program and data spaces are combined through the use of an AND gate 40 (FIG. 3) in combination with the read signals (RD#) on lead 42 from pin 13 of the microcontroller 28. This allows all external memory and peripheral devices to be accessed as both data and program locations. Referring to FIG. 4, the memory map for the PDCD 10 shows the relationships between program memory, data memory and the special function registers (SFR).

The read only memory internal ROM 44 consists of 4K bytes of memory containing the instructions for the basic functions of the PDCD 10, and it also contains the interrupt and reset vectors. The program of Appendix III is the code that is contained in the internal ROM 44 within microcontroller 28. This code does not change during operation.

The internal RAM 46 consists of 128 bytes of read/write memory wherein the lowest 32 bytes of RAM are organized as four banks of eight registers. Several single byte instructions operate on these registers allowing the development of highly compact code. The next sixteen bytes (128 bits) of RAM 46 can be bit-addressed, making these bytes useful for storing flags and other single bit entities. Any of the 128 bytes in internal RAM 44 can be addressed with the direct addressing mode, allowing the development of compact and fast code.

The special function registers 48 are comprised of 128 bytes of register space, and these registers control the function of the special features of the microcontroller 28, including the serial port, interrupt controller and external ports. 3,968 bytes of unused data space 50 are reserved for external data. These bytes are the only external bytes in the system that cannot be accessed as program memory. This space is reserved for the potential use of a microcontroller having additional internal RAM. Data space 52 consists of 4K bytes of unused memory space. The bytes in this area and all areas with higher addresses, are shared between program and data memory. These bytes are reserved for the potential use of a microcontroller having additional internal ROM. Finally, a reservation space 54 includes 8K bytes of unused memory space which are reserved for potential use in a future revision of the product.

A storage section 56 consists of 8K bytes of space reserved for the LCD 31 registers. The LCD controller includes two internal registers that are accessed through this memory space 56 by means of special register base addresses. Storage space 58 is reserved for 8K bytes of space for scanning the keypad 34. Write operations in area 58 have no effect, but reads from this area return the status of the keypad column lines in the low nibble of the byte. Thus, the address within the 8K area that is read will determine which keypad row is scanned. Sixteen K bytes of memory space 60 are reserved for RAM. These bytes are reserved for potential expansion of the RAM available to the PDCD 10, and the design of the PDCD 10 allows the replacement of the existing 8 KB RAM integrated circuit with a 32 KB RAM. If the 32 KB option is used, then this 16K block of memory and the following two 8K blocks of memory combine into a single 32K block of external RAM memory. Thus, the 8K RAM space 62 which shadows the following 8K bytes of memory within storage space 64 consists of 8k bytes of read/write memory that is occupied by the 8 KB RAM IC located in the SRAM memory 64 (see also FIG. 1). This memory 64 can be used for program instructions, application data or other purposes. The memory is shadowed in the previous block 62 to allow for future expansion of the PDCD RAM.

The program listed in APPENDIX I is contained in the External RAM. This is the code that is downloaded into the PDCD by the SPF when the PDCD is docked. This application code can be easily updated by the SPF whenever it is required.

The microcontroller 28 (FIG. 3) contains two internal counter/timers which in the PDCD 10 are configured as timers that increment once per machine cycle at a rate of 307.2 kilohertz. Timer 1 is used to generate the serial port baud rate. When generating a serial port baud rate, timer 1 is configured as an 8-bit incrementing register with an additional reload register wherein the incrementing register increments by one with each machine cycle. When the 8-bit register overflows, it automatically reloads with the value in the reload register.

The value in the reload register is determined from the desired baud rate based on the following formula:

Reload Value=256−(*K*xOsc. Freq.)÷(384xBaud Rate), or for the PDCD 10, (1)

Reload Value=256−(19,200÷Baud Rate) (2)

For the PDCD 10, K is equal to 2, indicating that the SMOD bit is set to 1. The following table lists some possible baud rates and reload values:

| Baud Rate | Reload Value (Hex) |
|---|---|
| 19,200 | 255 (O × FF) |
| 9,600 | 254 (O × FE) |
| 4,800 | 252 (O × FC) |
| 2,400 | 248 (O × F8) |

The microcontroller 28 (FIG. 3) contains an internal serial port which is configured to use timer No. 1 to set the baud rate. The serial port uses the TXD pin 70 and the RXD pin 72 to connect to the storage and processing facility (to be described). The serial port is then used in mode 1 to provide communications with a single start bit (0), an 8-bit data word, and a single stop bit (1). There is no parity bit and this is equivalent to the standard 8N1 UART (Universal Asynchronous Receiver/Transmitter) setting. The serial port has a one byte receive register that stores the last byte received while the next byte is being received. This internal register must be read before reception of the next byte is completed or the data will be lost. The serial port can be set to generate a receive interrupt, which will occur when the stop bit of an incoming byte is received.

The microcontroller 28 buss interface consists of eight multiplexed data/address pins AD0–AD7, eight dedicated address pins and four control signals. This buss interface responds to all accesses of external memory for both program and data space. As mentioned in the memory section, the PDCD 10 combines external data and program space into one logic address space. The least significant 8 bits of the address pins AD0–AD7 are multiplexed with the data bits. During an access to external memory, these address pins are first driven with the low-order address bits. The ALE signal on line 74 is used to latch the address bits into an octal latch 76, an IC-type 74HC373A stage. After the address is latched, the pins 78 are used for the 8-bit data buss for either read or write operation. A pull-down resistor 80 on the octal latch output enable (OE#) ensures that low address lines are always driven.

The most significant 8 bits of the address are assigned to dedicated pins while the remaining 8 address lines are labeled A08–A15 as extending through lead group 82. An inverter 84 generates the signal A15 on lead 86 which is opposite in polarity to the highest address line A15 of group 82 and is used to generate chip selects for the lower half of external memory. The three control signals in addition to ALE are used as read and write strobes. That is, for data space there is both a read strobe on line 42 and a write strobe on line 84 and, for program space, there is only a read strobe on line 86. The external AND gate 40 is used to generate the read signal at output 88 and this signal will be active for reads to either program or memory space. This results in the combined external memory space as described previously in the memory section.

The control port of microcontroller 28 consists of 8 remaining pins which are used to control and access other portions of the circuitry of PDCD 10. The control ports 90 are used to control the 5 volt supply, the backlight, and the VCC B supply, and control port 92 is used to control access to the serial number IC, to be described. A serial number ROM 94 (FIG. 1) is read through two of the control port pins. Thus, the clock signal on lead 92 is used as a serial clock that accesses the serial number ROM 94, and the data signal on line 96 is used to receive the serial number data from the ROM 94. The microcontroller 28 includes an interrupt section which can generate an interrupt in response to several internal or external events. In the PDCD 10, the microcontroller 28 will generate an interrupt in response to the ON key, the low battery comparator, timer 0 or the serial port, and such interrupts may be set to high or low priority level. A stabilized crystal oscillator 98 provides frequency reference for the microcontroller's timers and instruction clock. The 3.6864 megahertz crystal 100 provides a base frequency that divides into both the required timer interval of 10 milliseconds, and the standard baud rates, including 19,200 bps.

The serial number block 94 (see FIG. 1) contains a 128-bit serial EEPROM, IC-type X24001. The EEPROM's 128-bit memory is organized as 16 8-bit words which contain serial number information for the PDCD 10, i.e., the particular personal unit, as well as the SSI document for the PDCD (including options code, revision level and status code), 8-bits of test pass/fail information and a 16-bit CHECK-SUM. The following table shows organization of the EEPROM in serial number unit 94.

| Field Name | Length | Description |
| --- | --- | --- |
| Serial Number | 4 bytes | 32-bit PDCD Serial Number |
| Document Number | 5 bytes | SSI Engineering No. in ASCII |
| Options Code | 1 byte | SSI Engineering Code in ASCII |
| Revision | 2 bytes | SSI Engineering Revision Level in ASCII |
| Status Code | 1 byte | SSI Engineering Status Code in ASCII |
| Pass/Fail bits | 1 byte | Show pass/fail status |
| Checksum | 2 bytes | Checksum for previous 14 bytes |

Referring again to FIG. 1, the B buss control stage 102 provides isolation to the components on the VCC B buss when the VCC B supply 26 is switched off. In addition, buss control 102 drives the control signals for the liquid crystal display (LCD 31) as well as the row lines of the keypad 34.

The LCD stage 31 contains the liquid crystal display and its supporting circuitry. The display itself is a four line by ten character display, and each character consists of a grid 5 pixels wide and 7 pixels high. The LCD circuit 31 is powered by the VCC B supply 26 and can be isolated when it is not powered by the B buss control stage 102. The microcontroller 28 communicates with the LCD controller through the B buss 104, consisting of 8 data lines serving as a bi-directional data buss connection. A single address line is employed to select the instruction or data register of the LCD 31, and a control signal generated in B buss control 102 is used to select read or write operations. The operating frequency of LCD 31 is controlled through well-known resistor control of bias voltage.

A manufacturing connector stage 106 can receive a 14 pin connector in support of a manufacturing environment. That is, signals present on the connector may be useful for testing or EEPROM programming during production and include various ones of the multiple of power and interface signals associated with microcontroller 28.

Figure 5:
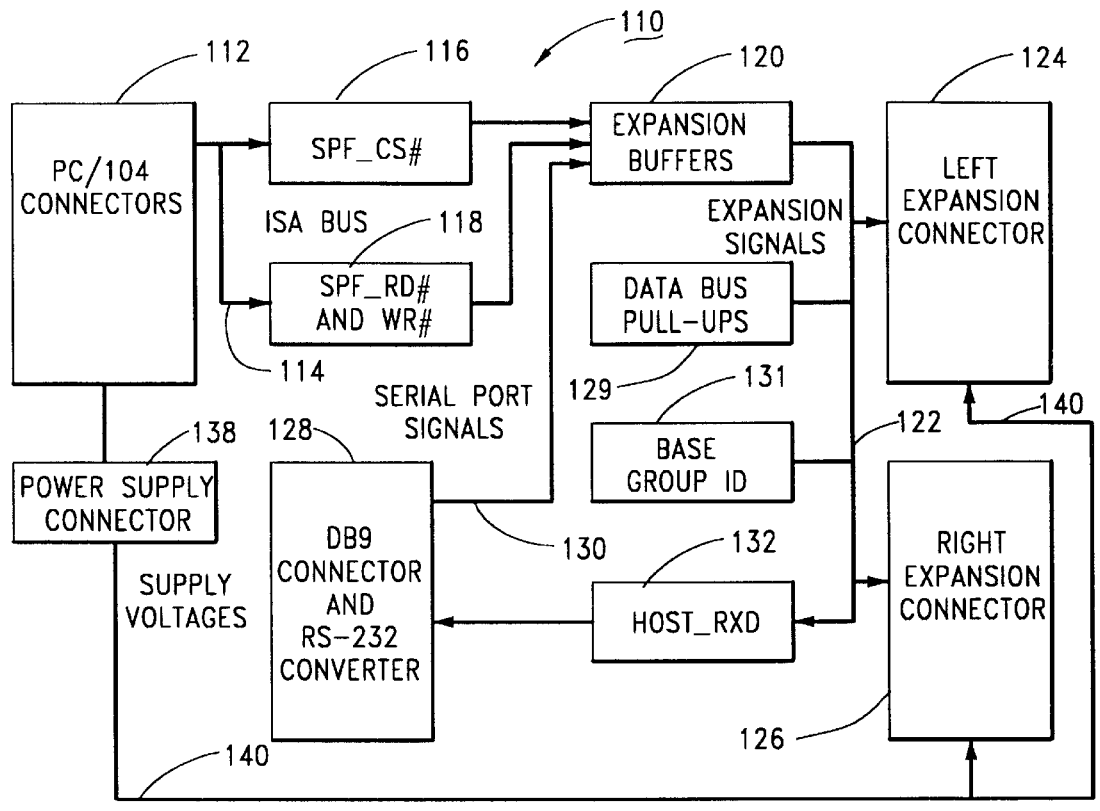
FIG. 5 is a block diagram of the SPF base unit.

Referring to FIG. 5, the SPF base 110 represents the primary storage and processing facility (SPF) within a Time Trak system installation. The SPF base 110 includes a PC/104 connectors section 112 that includes a PC/104 form factor processor that controls all activity in the SPF 110 unit through connection of processors. The PC/104 connectors 112 provide for the electrical connection of the ISA buss 114. There are two such PC/104 connectors, as will be more fully described with respect to FIG. 6 below.

The APPENDIX II is sample code for the program that runs on the PC/104 form factor processor. This is the code that communicates with the PDCD units, retrieves the time-based activity data from the PDCD's and translates the information into a format usable by accounting software.

ISA (Industry Standard Architecture) buss 114 connects to the SPF chip select section 116 and this provides a chip select signal for the entire SPF. ISA buss 114 is also applied to the SPF 110 read and write section 118 to provide qualification of the I/O read and write signals. Selected output signals from chip select section 116 and read and write section 118 are applied to expansion buffers 120 which provide signal buffering for those signals subsequently connected via buss 122 to the left and right expansion connectors 124 and 126. A connector stage 128, the DB9 connector and RS232 converter section, provides for the connection to the microprocessors RS232 serial port via the line 130 for serial port signals. The section 128 also provides for the voltage level conversion from the processors RS232 voltage levels to the PDCD voltage levels at TTL values. A voltage converter within section 128 allows configuration as one of four different power options. The serial port signals on line 130 are applied to expansion buffers 120 comprised of a pair of IC buffers type 74HC245A.

Figure 6:
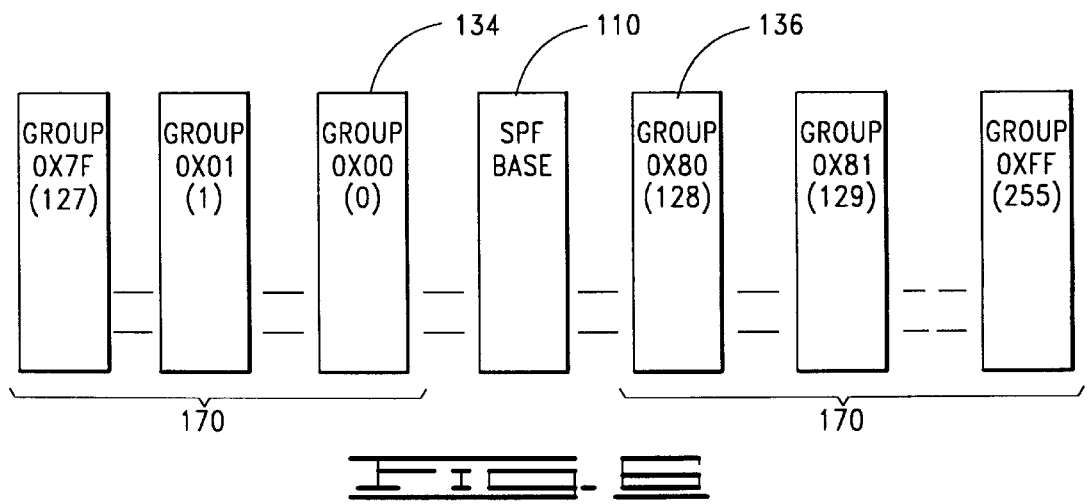
FIG. 6 is an illustration of base and group connection in a functional array.

Outputs from expansion buffers 120 via line 122 are applied to the left and right expansion connectors 124 and 126. Output from data buss pull-ups 129 are also applied with expansion signals on line 122 as are base group ID signals from the ID section 131. The data buss pull-up section 129 provides for a weak pull-up on bits of the expansion data buss by means of pull-up resistors (not shown) that insure that a data bit will be read at high if an access is made to a non-existent group or register. The base group ID section 131 provides for a starting self-index for the left and right expansion connectors 124 and 126. The self-index is an 8-bit number that uniquely identifies each group in a chain. Each group has a self-index one higher than the self-index of the group one space closer to the base as shown in FIG. 6. A HOST RXD section 132 provides for the buffering of the RXD signals from the left and right expansion connectors 124 and 126.

The HOST RXD section 132 utilizes an OR GATE in combination with inverters to insure that the HOST RXD signal will become low whenever either the HOST RXD left or HOST RXD right signals are low, thus allowing the RXD signal from the active side to dominate and drive HOST RXD section 132. A left expansion connector 124 provides for the connection to the first group on the left side of the base, i.e., SPF base 110. As shown in FIG. 6, this would be SPF group 134. A central SPF base 110 may operate with a full complement of groups on one side or both sides, depending upon the particular desired group array. Groups on the left side may be indexed from zero to 127 and groups on the right side of base 110 may be indexed from 128 upward to 255, the total of a group complement. Through the SPF group 134, all other groups on the left side are connected to the SPF base 110. Similarly, all groups to the right of SPF group 136 would be connected therethrough to the SPF base 110. The left expansion connector 124 provides the buffered data buss signals D00 EXP through D07 EXP; the buffered address lines A00 EXP through A02 EXP; the strobes IOW EXP and IOR EXP; the chip select, CPF CS; the serial port signals, host TXD EXP and host RXD LEFT; the reset signal, RESET EXP; as well as the power voltage, ground and the base group index signals, LEFT IDX7, BASE IDX0–BASE IDX6. The right expansion connector 126 provides for the connection to the first group 136 on the right side of the SPF base 110 of the counterpart right side buffered data buss signals.

A power supply connector 138 (FIG. 5) provides the source for four power voltages, +5 volts, −5 volts, +12 volts and −12 volts. The power system is modular in design allowing larger capacity supplies to be used as the number of expansion groups increases and the power configuration can also be changed to accommodate different PC/104 processor boards and peripheral options. Supply voltages are conducted on line 140 for distribution to the left and right expansion connectors 124 and 126.

Figure 7:
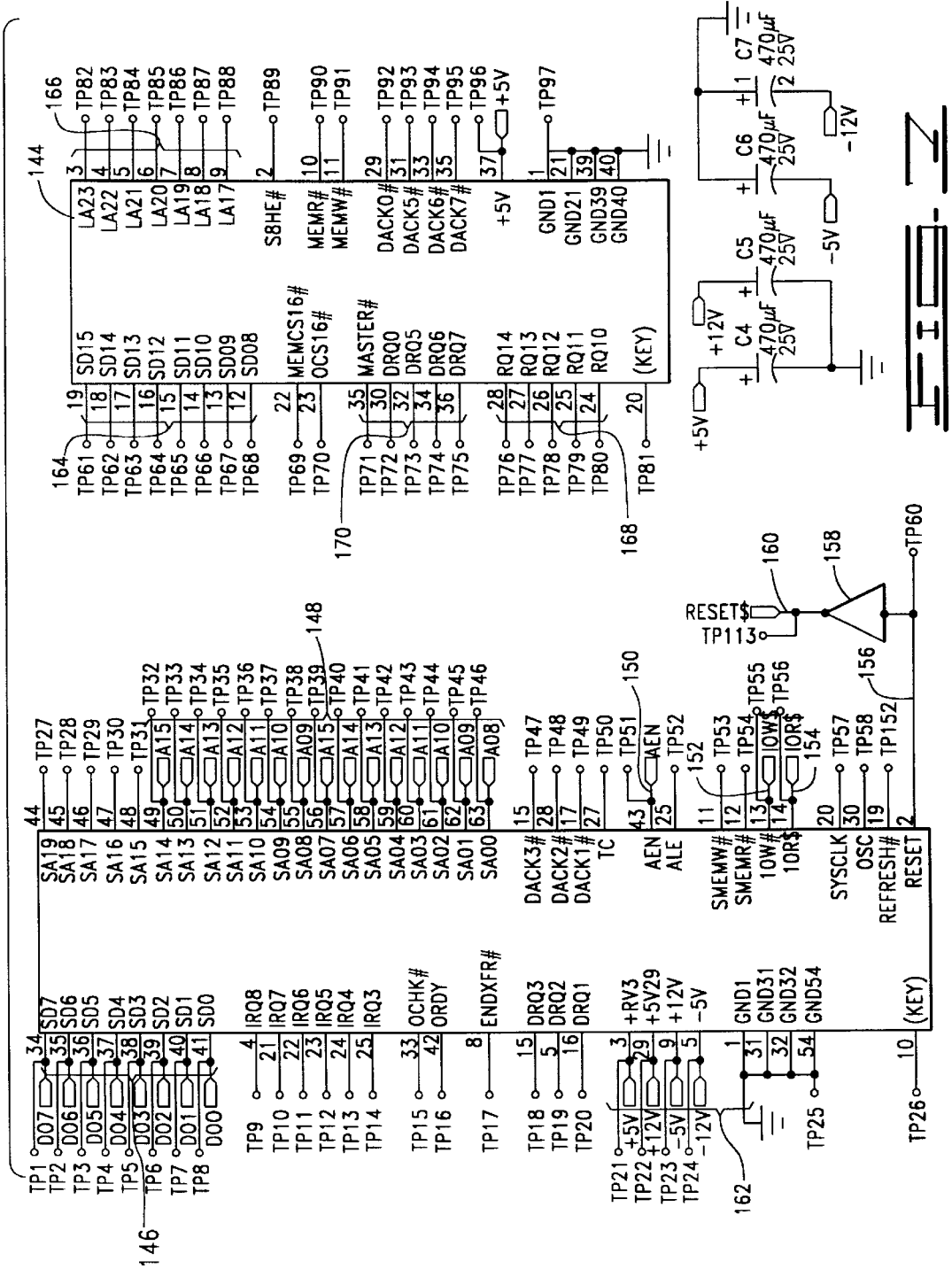
FIG. 7 is a schematic diagram illustrating the manner of microprocessor employed in the SPF base unit.

FIG. 7 illustrates in greater detail the PC/104 connectors 142 and 144, which connectors provide for a form factor processor to be connected to the SPF 110 component. This processor controls all activity in the SPF 110 and connectors 142 and 144 provide for the electrical connection of the ISA buss. The PC/104 form factor connectors 142 and 144 support an off-the-shelf computer board that is pre-designed and pre-programmed to deliver specific operational functions. The PC/104 connectors 142 and 144 support a type PC104AB computer board which is commercially available from Micro/Sys Inc. of Glendale, Calif.

The connector 142 provides the 8-bit ISA (Industry Standard Architecture) data buss signals 146 representing D07–D00; fifteen signals of the 20-bit address buss 148 or signals A00–A14; an address enable signal 150; the I/O space strobe signals 152 and 154 and an active high reset signal 156. An inverter 158 generates an active low reset signal as present at output 160. The connector 142 also provides the power voltages and ground at port connections 162. Other signals present on connector 142, but not used, include the interrupt request lines, the DMA request and acknowledgement lines, the system memory strobes and the refresh and clock signals.

Connector 144, type PC104CD, receives +5 volt and ground power connection, but no other signal connections are made. The unused signals on the connector 144 include the high order 8-bits 164 of the data buss, the unlatched address lines 166, the high order interrupt request lines 168, additional DMA request and acknowledgement lines as well as the memory and I/O 16-bit access request lines 170.

Referring now to FIG. 8, the block diagram represents an SPF group 170 of which there are a plurality employed in a Time Trak system. FIG. 6 illustrates the manner in which a central SPF base 110 may employ a plurality of outward extending SPF groups 170 extending outward on either or both sides of base 110. The FIG. 8 illustration shows the part 1 of an SPF group 170 while the block diagram of FIG. 9 illustrates part 2 of the group section which are duplicated eight times in each group, once for each PDCD slot.

The left previous connector 172 (FIG. 8) provides for the electrical connection between two groups in a Time Trak system. The left previous connector 172 of one group will connect to the right next connector 174 of the group disposed to its immediate left in the group array (see FIG. 6). This connector sequence is only used for groups that are on the right side of the SPF base 110. The left previous connector 172 is a thirty pin connector and is the source of the control signals and address lines for the particular group 170. The signals include the address lines, A00 through A02; the read and write strobes, IOW# and IOR#; the chip select, SPF CS#; the reset line, RESET#; and the host TXD signal. The host RXD signal is an output to the previous group, and the bi-directional data base as well as the previous group's self-index (PREV IDX0–PREV IDX7) also appear on this connector. Thus, the left previous connector 172 may be interconnected with either a left expansion connector 124 of SPF base 110 or the right next connector 174 of a next successive SPF group 170.

A right previous connector 176 also provides for the electrical connection between two groups in a Time Trak system; however, the right previous connector 176 of one group will connect to the left next connector 178 of the group to its immediate right. Consequently, this connector is only used for groups that are on the left side of the SPF base 110.

The right previous connector 176 also consists of a thirty pin connector and it is the source of the control signals and address lines for the group 170. Once again, the signals include the address lines, A00–A02; the read and write strobes, IOW# and IOR#; the chip select, SPF CS#; the reset line, RESET#; and the host TXD signal. The host RXD signal is an output to the previous group and the bi-directional data buss and the previous group's self-index (PREV IDX0–PREV IDX7) also appear on this connector 176.

A data buss 180 connects from left and right previous connectors 172 and 176 to expansion buffers 182 as well as to a PDCD index register 184, a group status register 186 and a group control register 188, as will be further described below. Also, a control buss 190 interconnects from each of left and right previous connectors 172 and 176 to the address decoding stage 192 which provides register strobe output on line 194 to each of the registers 184, 186 and 188.

A group index register 196 is connected between data buss 180 and a group enable stage 198. The group index register 196 provides for storage and read back of the index representing the currently active group within the Time Trak system. The group index register 196 includes an octal latch, IC Type 74HC273A which stores the 8-bit value present on the data buss on the rising edge of the GRP IDX WR# strobe. This value drives the group index lines GRP IDX0–GRP IDX7, and the group index should not be confused with the self-index which is controlled through software and is stored as the same value in every group's group index register 196.

A self-index 200 is determined by hardware and is different for each group 170. A self-index line 202 provides input from both left and right previous connectors 172 and 176 to self-index stage 200 with subsequent output to group enable stage 198. The self-index section 200 provides for the generation of the group's self-index which uniquely identifies the group by its position in relationship to the SPF base 110. See FIG. 6. The first group 134 to the left of the base 110 has a self-index of 0x00. The first group 136 to the right of the base 110 has a self-index of 0x80. All other groups 170 in the array have a self-index of 1 greater than the self-index of the group 170 that lies one position closer to the base 110. A plurality of XNOR gates functioning with a hex inverter form an "add one" circuit that makes the 8-bit self-index (SLF IDX00–SLF IDX07) equal to one plus the previous index (i.e., PREV IDX0–PREV IDX7). Thus, the highest logic index for the left side is 0X7F and the highest logical index for the right side is 0XFF as illustrated in FIG. 6. This allows up to 256 groups 170 to be logically addressed by the SPF base 110. Electrical considerations will limit this value to sixteen groups 170 on each side of the base 110.

The group enable stage 198 provides for a GRP EN signal that indicates when a group 170 is the active group. A group 170 is the active group when its self-index matches the current group index, and this stage also provides the SAME SIDE and SAME SIDE # signals that indicate when a group is on the same side of the base as the active group. The group enable stage 198 consists of a plurality of XNOR gates working into a thirteen-input NAND gate, IC Type 74HC133, so that the GRP EN# is valid when the group index and the self-index signals are identical.

The address decoding stage 192 provides for the generation of read and write strobes for each of registers 184, 186 and 188 in the particular group 170. The base address for decoding is controlled through the SPF CS# signal, generated by the SPF base 110, and the address lines, A00–A02, are used to select between up to eight addressable registers. In the SPF, only the even numbered addresses are used with four register addresses available for future expansion. The write strobe for the group index register 196, GRP IDX WR#, is enabled on write to the appropriate address even when the particular group is not the active group. All other write strobes and all other read strobes are only enabled when the group 170 is the currently active group. The 3-to-8 demultiplexer, an IC Type 74HC138A, provides the write strobes, GRP CTRL WR#, PDCD IDX WR# and PDCD CTRL WR#. An additional 3-to-8 demultiplexer, also an IC-Type 74HC138A, provides the requisite read strobes, and the seven read and write strobe signals are forced inactive when the group enable signal is inactive. A table of decoded addresses is as follows:

| I/O Address | Read/Write | Register | Quantity |
| --- | --- | --- | --- |
| 0 × 0328 | R/W | Group Index | 1 per SPF |
| 0 × 032A | W | Group Control | 1 per group |
| 0 × 032A | R | Group Status | 1 per group |
| 0 × 032C | R/W | PDCD Index | 1 per group |
| 0 × 032E | W | PDCD Control | 1 per PDCD (8 per group) |
| 0 × 032E | R | PDCD Status | 1 per PDCD (8 per group) |

The expansion buffers 182 provide signal buffering for the signals connected to the expansion connectors, left next connector 178 and right next connector 174. An octal, tri-state transceiver, IC-Type 74HC245A, provides buffering for the data buss signals, D00–D07, to generate respective expansion signal outputs. The transceiver is enabled when the buss activity is not a read from the SPF, or when the group is not the active group, but the group 170 is on the same side as the active group. In other words, the transceiver is always enabled unless the bus activity is a read from the SPF. Yet another octal transceiver, IC-Type 74HC245A, provides buffering for the control signals and address lines. The lower three address lines, A00, A01 and A02, drive the expansion address line, and this additional transceiver is forced to always drive from the control signals to the expansion connector by means of a pull-up resistor.

The left next connector 178, a thirty pin connector, provides for the electrical connection between two groups in a Time Trak system. The left next connector 178 of one group will connect to the right previous connector 176 of that group 170 that connects to its immediate left. This connector is only used for groups 170 that are on the left side of the base. The right next connector 174 provides similarly for the electrical connection between two groups in a Time Trak system. The right next connector 174 of one group will connect to the left previous connector 172 of the group 170 that lies to the immediate right, and this connector 172 is only used for groups that are on the right side of the SPF base 110. The right next connector 174, also a thirty pin connector, provides the control signals and address lines for the next group 170 in the chain. The signals include the address lines, the read and write strobes, chip select, reset, as well as the bi-directional data buss and the group self-index data.

The PDCD index signal on line 202 is input to each of a PDCD control right demultiplexer 204, a PDCD status read demultiplexer 206, a PDCD RXD demultiplexer 208 and a PDCD TXD demultiplexer 210. The PDCD write demultiplexer 204 provides write strobes for the eight individual PDCD 10 control registers that are associated with the particular SPF group 170. The demultiplexer 204, an IC Type 74HC138A, is the source of the control strobe signals, CTRL WR#00 through CTRL WR#07. One of these strobes is effective when the present group is enabled and a write access is made to the PDCD control register 188. The specific PDCD 10 enabled is determined by a 3-bit PDCD index signal that is present on line 202.

The PDCD status read demultiplexer 206 provides the read strobes for the eight individual PDCD status registers; that is, the individual status registers present in each of eight PDCD 10 units. The demultiplexer 206, an IC Type 74HC138A, is the source of the signals, STATUS RD#00–STATUS RD#07. One of these strobes is active when the present group is enabled and a read access is made to the PDCD status register 186. The specific one of the PDCD units enabled is determined by the 3-bit PDCD index signal present on line 202. A PDCD TXD demultiplexer section 210 provides the transmit data signals for the eight individual PDCD units. The demultiplexer, an IC Type 74HC138A, is the source of the signals TXD00 through TXD07. One of these signals is connected to HOST TXD when the present group is enabled and the remaining TXD XX signals are driven high. The specific PDCD 170 connected is determined by the 3-bit PDCD index on line 202.

The PDCD RXD multiplexer 208 drives the HOST RXD signal, selecting the signal from one of the eight individual PDCD 170 units or from the next succeeding group 170. The multiplexer, an IC Type 74HC151A, selects one of the signals RXD00 though RXD07, for possible connection to HOST RXD. The HOST RXD signal is connected to the appropriate source through a process of logical selection exercised by two OR GATES and one AND GATE.

The group control register 188 provides the ability to control the status LED test mode and serial ports broadcast mode. An octal latch, IC Type 74HC173A, stores the value present on the data buss on the rising edge of the group control write signal. The signals RED TEST, GRN TEST and LED TEST are then used to control the status LEDs of all PDCD units in the group. Broadcast mode can be used to update the program memory, the real time clock or any other data that is the same for all PDCD units. The group status register 186 provides for accessing the status of the group and reading back the state of the control register bits. An octal transceiver, IC Type 74HC245A drives the data buss with the status bits when the read strobe GRP STATUS RD#, is active or low. In addition to the control signals, the status register 186 allows access to the power off and tampered bits which provide indication when the group case enclosure has been opened. A tamper stage 212 includes an IC Type 74HC74A which detects any tampering with the SPF enclosure box to provide an indicator signal consisting of two status bits to indicate that the group case has been opened.

A TXD broadcast control stage 214 generates the control signal for use in broadcast mode that allows a selected group 170 to transmit to all eight of its PDCD sectors at the same time.

The functional blocks in part 2 of the group 170 section, FIG. 9 showing the SPF group—Part 2, are duplicated for each of the eight PDCD units that are supported by the particular SPF group. All previous functional blocks occur only once in each group, and all reference designators in the following descriptions apply to the first PDCD block, i.e., PDCD 00. Thus, the multiplexer and demultiplexer outputs on leads 216, 218, 220 and 222 are applied to each of the eight group 2 sections (FIG. 9) interconnecting as illustrated.

A PDCD status register stage 224 provides for accessing the status of the selected PDCD unit and to read back the control bits for the same PDCD unit. An octal transceiver, IC Type 74HC245A, drives the data buss with the status bits when the read strobe, STATUS RD 00# is active low. In addition to the control signals, the status register 224 allows access to the battery status signals to test battery operability.

| O x 032E | PDCD STATUS (R) |
|---|---|
| D0 | PDCD Present |
|  | 0 = PDCD Not present in slot |
|  | 1 = PDCD Present in slot |
| D1 | Ready/Busy |
|  | 0 = PDCD is Busy or Not Present |
|  | 1 = PDCD is Ready (All interface operations completed) |
| D2 | Read-back of Normal Charge Enable Control (60 mA) |
|  | 0 = Normal Charge Disabled |
|  | 1 = Normal Charge Enabled |
| D3 | Read-back of Fast Charge Enable Control (220 mA) |
|  | 0 = Normal Charge Disabled |
|  | 1 = Normal Charge Enabled |
| D4 | Battery High |
|  | 0 = Battery Voltage Below 2.6 V |
|  | 1 = Battery Voltage Above 2.6 V or PDCD Not Present |
| D5 | Battery Low |
|  | 0 = Battery Voltage Above 2.0 V or PDCD Not Present |
|  | 1 = Battery Voltage Below 2.0 V |
| D6 | Read-back of Reset Control |
|  | 0 = Normal Operation |
|  | 1 = Reset Mode Forced |
| D7 | Reserved |

A PDCD control register 226 provides the ability to control the selected PDCD unit's reset state and battery charging rate. An octal latch, IC Type 74HC273A, stores the value present on the data buss on the ris ing edge of a control write signal, CTRL WR#00. A PDCD LED control stage 228 provides for control of the two status LED units for the PDCD. These indicators illustrate the two modes of operation either automatic mode or test mode. A ready section 230 generates an indication when all operations for the PDCD have been completed.

A PDCD connector 232 receives both of leads 220 and 222 to provide electrical connection and interface to the supported PDCD. The connector 232 is connected to battery monitor 234 and battery charging circuit 236, and battery status indication is conducted on leads 238 to the status register 224 and ready stage 230.

In operation, the Time Trak system is an activity based time accounting system that automatically creates a computer network accessible data file which details the activity based time accounting for each empl oyee on a daily basis. The system consists of a small, lightweight personal data collection device, PDCD 10, as well as a network connected intelligent storage and processing facility, the SPF 110 and related SPF groups. The SPF may be configured to communicate to an industry standard computer network system, or it may be configured to communicate to a dedicated computer system using a standard serial interface. The SPF is available in various configurations that allow the product to be used in a desk top arrangement for a small professional office with one or more employees, or a wall mounted "rack" system capable of supporting a large number of employees.

The PDCD 10 is a small, lightweight personal data collection device used to record an employee's time accounting activities during his work period. The device is small enough to be attached to a person's belt or clothing, or may be carried in a pocket during a work period. The PDCD 10 has a rechargeable battery that is automatically recharged when the unit is not in use; that is, when the PDCD 10 is placed in storage location on the SPF unit during non-working hours. The PDCD 10 has a keypad 31 which allows the user to enter numeric JOB and ACTIVITY codes. The PDCD 10 also has an LCD display 31 that is used to display the current time of day as well as the current job and activity data. The microprocessor 28 controlling the PDCD 10 keeps an accurate time of day clock and automatically time stamps each job and activity code entries. A chronological record of job and activity events are stored in a non-volatile memory 64 (see FIG. 1) When the PDCD 10 is returned for placement at the SPF unit, the PDCD 10 microprocessor 28 responds to commands from the SPF unit such as uploading job and activity code data.

Figure 10:
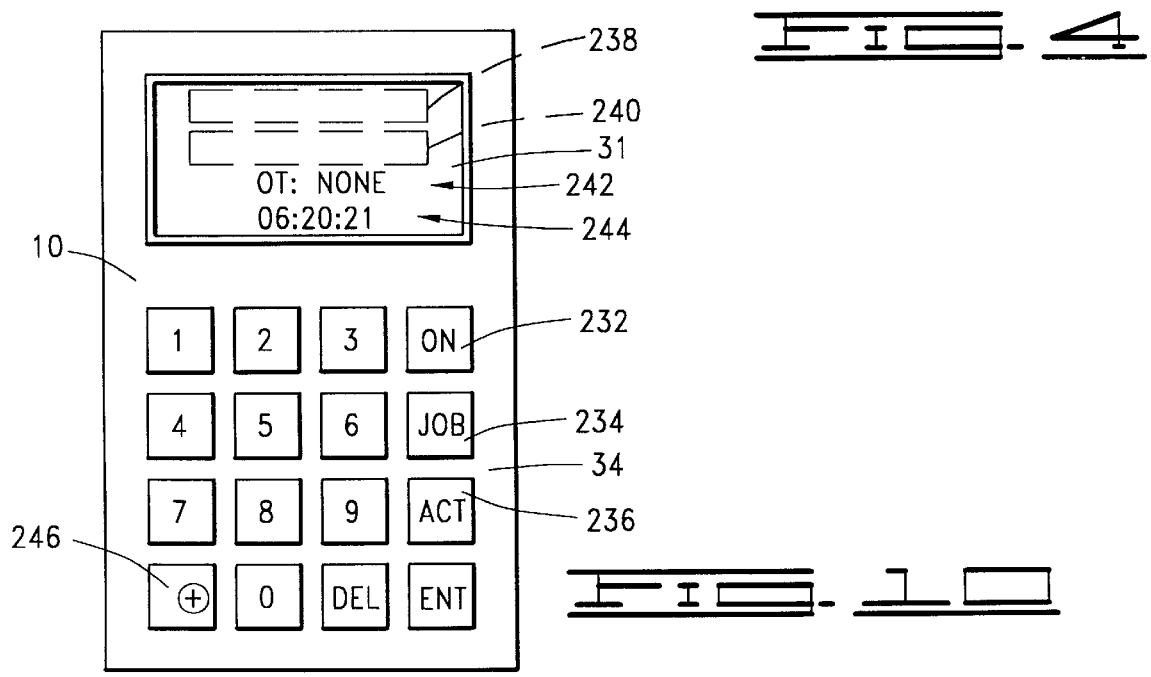
FIG. 10 is a plan view of a PDCD unit prior to beginning work stage.

Referring to FIG. 10, the PDCD 10 includes the LCD display 31 as well as a keypad 34 that includes numeral keys 1–0 as well as an ON key 232, JOB key 234, ACT key 236 as well as function keys for BACKLIGHT, DELETE and ENTER, as illustrated. Upon arrival at the work site, a user observes the LED adjacent to his PDCD 10 unit to see if the LED is green and, if so, the user removes the PDCD 10 from the SPF for placement and carriage on his being. By pressing the ON key 232, the display 31 is activated to display and verify the user's name and schedule, and he may consult his supervisor if the LED is not green or if the listed name is not correct. At this initial activation, the employee's name will appear in the space 238 while the present day's work schedule will appear in the space 240. If overtime is authorized it prints out on the line 242 over the current time on line 244. A BACKLIGHT key 246 may be depressed to activate backlight for low illumination conditions and this turns off automatically after five seconds.

FIGS. 11A through D illustrate the display 31 readouts for various phases of operation. In FIG. 11A, when the work period begins, the user presses the ON key 232 and then the JOB key 234 to bring about a display screen as shown with current time line 244 and job data lines 248 and 250. The job data lines will be blank since this is the first entry for the work day. Referring also to FIG. 11B, the job and activity information may be entered in two parts. That is, using the number keys, the user enters the job number that he plans to begin work on which job number appears on the status and entry line 252. If a mistake is made, the user need only press the DEL key to erase the entry and start over. After the job number is correctly entered, the user presses the ACT key 136 whereupon a dash appears after the job number.

Referring now to FIG. 11C, the user presses selected number keys to enter the activity code which appears after the dash as the entire job-activity code appears in space 240 of display screen 31. Once again, if the user makes a mistake he need only press the DEL key to erase the entry and start over, and to cancel the entry completely he need only press the DEL key twice. After correctly entering the activity code as it appears in space 240 of display 31, the user presses the ENT key to record the entry and at this time the space 252 displays "OK" to indicate that the entry was completed. If the user should notice that the entry is incorrect after he has already pressed the ENT key, he can still correct it by pressing the JOB key 234 and starting the procedure all over again.

Breaks and lunch periods are also assigned a JOB and ACTIVITY code number as well in order to maintain full record of the user's time. If the user begins a new activity on the same job he only needs to press the ACT key 236 and then enter the new activity code using the number keys (usually a two digit number) whereupon the user presses the ENT key to record the new activity. Once again, with a mistake, press the DEL key and start over. In FIG. 11D, the display 31 shows full operational mode with space 238 indicating the date that the job was started (3/15) as well as the time that the job was started (0629). The space 240 indicates the job-activity code while the current time is indicated on line 242 and line 244 provides automatic copying of the job number to receive an alternative activity code if such is required.

At the end of a work period, the user may enter the "clock out" job and activity code and return the PDCD 10 to the SPF location assigned to the particular user. He may observe the LED adjacent to the PDCD 10 slot and verify that it turns red to indicate that the PDCD 10 has been properly inserted into the SPF.

The SPF provides a storage location for all PDCD devices during non-working hours and facilitates the automatic collection of the time accounting information stored in each of the PDCD device memories. The SPF data storage is non-volatile and utilizes a battery backup power system that provides power outage tolerance and data safety. The SPF controls the PDCD using a communications protocol and command set.

The foregoing discloses a novel time track system that is capable of monitoring activity based time records for a number of employees, ranging from a relative few individuals up to a large work force, while performing a wide variety of job activities. The system enables totally automated time accounting of a work force while leaving no factor to chance. The present system is an entirely novel approach to time accounting systems, especially of the type that maintains record of so much variable information that may figure dominantly in cost accounting methods.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. An activity based time accountin system, comprising:
   a plurality of personal data collection devices (PDCD) for disposition on the person of selected users during a predetermined use period;
   a central storage and processing facility (SPF) for receiving and storing each of the PDCD units in electrical interconnection during other than said predetermined use period;
   means in said PDCD units for recording time accounting information for each of said selected users during said predetermined use period;
   means in said SPF central unit for collecting all user time accounting information during other than said predetermined use period; and
   means for communications with a network computer that includes selected business accounting software;
   wherein said SPF unit includes:
      a non-volatile data storage;
      resident software including the PDCD software which is downloaded by the SPF to the PDCD; and
      means for formatting the time accounting data to create a data file for access by said network computer.

2. An activity based time accounting system, comprising:
   plurality of personal data collection devices (PDCD) for disposition on the person of selected users during a predetermined use period;
   a central storage and processing facility (SPF) for receiving and storing each of the PDCD units in electrical interconnection during other than said predetermined use period;
   means in said PDCD units for recording time accounting information for each of said selected users during said predetermined use period;
   means in said SPF central unit for collecting all user time accounting information during other than said predetermined use period; and
   means for communications with a network computer that includes selected business accounting software;
   wherein said PDCD units each include:
      a rechargeable battery;
      a non-volatile memory;
      an LCD display; and
      a keypad for entering job and activity codes; and
   wherein said SPF unit includes:
      a non-volatile data storage;
      resident software including the PDCD software which is downloaded by the SPF to the PDCD; and
      means for formatting the time accounting data to create a data file for access by said network computer.

3. A time accounting system for automatically collecting and interpreting information for input to a network computer system to effect activity-based cost accounting, comprising:
   a storage and processing facility (SPF) base section which includes a microprocessor, and circuit means providing an interface between the time accounting system and said network computer system;
   at least one SPF group sections connected in parallel with the SPF base section;
   a plurality of interface circuits disposed in each one of said SPF base and group sections; and
   a plurality of personal data collection device (PDCD) units detachably connected to each of said plurality of section interface circuits during non-use of said time accounting system;
   whereby said plurality of PDCD units is each detached for carriage by a designated user during use of said time accounting system.

4. A time accounting system as set forth in claim 3 wherein:
   each one of said SPF group sections provides interface and support circuitry for up to eight PDCD units.

5. A time accounting system as set forth in claim 3 wherein:
   the SPF base section microprocessor is modular using a standard form factor that allows several different options for processor speed and memory.

6. A time a accounting system as set forth in claim 3 wherein said SPF base section further includes:
   left and right expansion connections for connection to respective first SPF group sections on the left and right sides of said SPF base section.

7. A time accounting system as set forth in claim 6 wherein each of said SPF group sections further comprise:
   left and right previous connectors for electrical connection between two SPF group sections to be located on respective left and right sides of said SPF base section; and
   left and right next connectors for electrical connection to respective left and right previous connectors between two SPF group sections.

8. A time accounting system, comprising:
   a plurality of self-powered personal data collection devices (PDCD) to be carried by a respective plurality of users, each collection device including:

a microcontroller including SRAM and SROM memory, a liquid crystal display, a keypad, and a regulated battery power supply;

a storage and processing facility base unit disposed at a work central location;

a plurality of storage and processing facility group units connected serially with an end group unit connected to said base unit; and a second microprocessor disposed on said base unit and controlling operation of said base unit and said group units.

9. A time accounting system as set forth in claim 8 wherein said storage and processing facility base unit comprises:

first and second printed circuit connectors seating respective first and second form factor microprocessors which provide an output bus of industry standard architecture address signals;

expansion buffer means receiving said address signals to generate left and right expansion signals;

a left expansion connector receiving said left expansion signals to provide for connection to a first group unit on the left side of said storage and processing facility base unit; and a right expansion connector receiving said right expansion signals to provide for connection to a first group unit on the right side of said storage and processing facility base unit.

10. A time accounting system as set forth in claim 9 which further includes:

a plurality of group units connected serially to said first group unit on the left side of said base unit.

11. A time accounting system as set forth in claim 9 which further includes:

a plurality of group units connected serially to said first group unit on the right side of said base unit.

12. A time accounting system as set forth in claim 8 wherein each of said storage and processing facility group units comprises:

a left previous connector and a right previous connector;

a data bus connecting said left and right previous connectors in parallel;

an expansion buffer connected to said data bus to generate an expansion bus output;

left and right next connectors receiving said expansion bus output;

a self index bus connecting said left and right previous connectors in parallel;

a self index stage connected to said self index bus to generate a self index signal that identifies the group by its position relative to the base unit;

a control bus connecting said left and right previous connectors in parallel; and an address decoding stage connected to said control bus to generate read and write strobes for each register in the group.

13. A time accounting system as set forth in claim 12 which further includes:

a group index register receiving input from said data bus for storage and read out of the group index signals representing the active group;

a group enable stage receiving said group index signals and said group self index signal to output a group enable signal to said address decoding stage which indicates when a group is the active group.

14. A time accounting system as set forth in claim 13 which further includes:

a register strobes output from said address decoding stage;

a personal data collection device index register receiving said data bus and said register strobes to generate a PDCD index signal;

a group status register receiving said data bus and said register strobes to access the status of the group and read out the state of the control register; and a group control register receiving said data bus and said register strobes to produce a control signal for broadcast mode wherein a selected group is enabled to transmit to as many as eight of the related personal data collection devices at the same time.

15. A time accounting system as set forth in claim 14 which further includes:

a PDCD control Write Demux receiving said PDCD index signal to generate eight write strobes for input to selected PDCD units;

a PDCD status Read Demux receiving said PDCD Index signal to generate eight read strobes for input to selected PDCD units;

a PDCD RXD mux receiving said PDCD Index signal to select a HOST RXD signal from either eight individual PDCD units or from the next group; and a PDCD TXD Demux receiving said PDCD Index signal to generate transmit data signals for the eight individual PDCD units.

16. A method of automatic activity based time accounting using a computer network in communication with a central storage and processing facility (SPF) and a plurality of personal data collection devices (PDCD), comprising:

plural PDCD units each carried by a respective employee during work periods;

each PDCD unit having a memory, an LCD display, and a keypad for entering job and activity codes and employee identification;

docking each of the PDCD units in the SPF unit during the non-work periods said docking being made with electrically interactive connection;

collecting the time accounting information stored in the PDCD memory during the non-work periods for communication to said computer network.

17. A method of time accounting as set forth in claim 16 wherein:

a first program that is contained in the internal ROM portion of the PDCD unit microcontroller is constant during operation of the time accounting procedure;

an application program contained in the external RAM of the PDCD is the program that is downloaded into the PDCD units by the SPF unit when the PDCD unit is docked; and a sample program runs on the PC/104 form factor processor in the SPF unit.

18. A method of time accounting as set forth in claim 17 wherein:

said sample program functions to communicate with the PDCD units, retrieves the time-based activity data from the PDCD units, and translates the information into a format useable by accounting software.

19. A method of time accounting as set forth in claim 17 wherein:

said application program can be updated readily by the SPF unit whenever it is required.

20. A method of time accounting as set forth in claim 17 which further comprises:

the ability to reprogram selected PDCD units individually as to behavior of display and keyboard, language of display information, and specific context help lists.

* * * * *

UNITED STATES PATENT AND TRADEMARK OFFICE
CERTIFICATE OF CORRECTION

Patent No.: 5,909,672

Dated: June 1, 1999

Inventors: Christopher L. Madore and Lanny E. Boswell

It is certified that errors appear in the above-identified patent and that said Letters Patent is hereby corrected as shown below:

Column 4, line 40, insert a new paragraph beginning with the word "In".

Column 13, line 33, change "ris ing" to --rising--.

Column 13, line 49, change "empl oyee" to --employee--.

Column 15, line 37, change "accountin" to --accounting--.

Column 15, line 61, insert --a-- before "plurality".

Signed and Sealed this

Eighteenth Day of April, 2000

Attest:

Q. TODD DICKINSON

Attesting Officer

Director of Patents and Trademarks